United States Patent [19]

Fetters

[11] Patent Number: 5,015,015

[45] Date of Patent: May 14, 1991

[54] CLIP SECURING ARRANGEMENT FOR VENTILATION SYSTEMS

[75] Inventor: David M. Fetters, Holland, Mich.

[73] Assignee: Hart & Cooley, Inc., Holland, Mich.

[21] Appl. No.: 530,610

[22] Filed: May 30, 1990

[51] Int. Cl.$^5$ ............................................ F16L 13/04
[52] U.S. Cl. ................................... 285/114; 285/305; 285/915; 285/179
[58] Field of Search ................. 285/305, 114; 265/260, 265/257, 915, 179

[56] References Cited

U.S. PATENT DOCUMENTS

| | | |
|---|---|---|
| 2,123,889 | 7/1938 | Gleason ............................ 285/114 |
| 2,785,910 | 3/1957 | Munger . |
| 2,831,711 | 4/1958 | Leadbetter . |
| 3,249,373 | 5/1966 | Goldstein . |
| 3,976,314 | 8/1976 | Graham . |
| 4,453,289 | 6/1984 | Kleykamp et al. ............. 285/242 X |
| 4,486,034 | 12/1984 | Sauer .................................. 285/242 |
| 4,676,530 | 6/1987 | Nordgren et al. . |
| 4,865,674 | 9/1989 | Durkin . |

FOREIGN PATENT DOCUMENTS 602547  5/1935  Fed. Rep. of Germany ...... 285/114

OTHER PUBLICATIONS

Hart & Cooley, Inc. "The Venting Solution for High-Efficiency Appliances", Brochure (5 pages).

Primary Examiner—Dave W. Arola
Attorney, Agent, or Firm—Varnum, Riddering, Schmidt & Howlett

[57] ABSTRACT

An interconnection arrangement (100) is disclosed for structurally interconnecting together pipe segments (102, 104) with a coupling device (106). In one embodiment, the coupling device is a sleeve coupling (106) having an inner diameter larger than the outer diameters of the pipe segments (102, 104). A set of four clips (118) are employed, with each clip (118) having a lip (120) and a series of tines (126). The clips (118) are engaged with longitudinal edge surfaces of the sleeve coupling (106), and the pipe segments (102, 104) are telescoped into the coupling (106). The tines (126) of the clips (118) "bite" into the inner surface (114) of the sleeve coupling (106), and the outer surfaces (108) of the pipe segments (102, 104).

20 Claims, 4 Drawing Sheets

CLIP SECURING ARRANGEMENT FOR VENTILATION SYSTEMS

BACKGROUND OF THE INVENTION

1. Field of the Invention

The invention relates to ventilation systems and interconnections of elements thereof, and more particularly, to interconnection elements interposed between pipes and pipe interconnection structures.

2. Description of Related Art

Historically, heating, air conditioning and other environment "controlling" devices employing fuels require ventilation systems for safely disposing of smoke, fumes and other residue gases. As a result of the chemical composition of the residue gases, many ventilation systems operate in relatively severe environments, and are subjected to physical/chemical phenomena which subsequently cause damage, such as pitting and corrosion. Accordingly, a substantial amount of technical research and development has been ongoing with respect to ventilation system design.

The structure and integrity of ventilation systems has become of even greater import during the last several years in view of the increasing use of higher efficient environment controlling appliances, such as high efficient furnaces. Continuously rising energy costs have created a large market demand for such appliances. However, such high efficiency devices place relatively greater demands on appliance ventilation systems.

For example, because high efficiency appliances actually utilize relatively more of the energy which they produce, less energy escapes through the ventilation systems. Accordingly, such ventilation systems will have relatively lower flue gas temperatures within the systems. With lower flue gas temperatures, condensation may occur. The moisture produced by the condensation, along with acidic residue from the flue gases, can produce a potentially damaging acidic condensate. For ventilation systems comprising metal elements, this acidic condensate can rapidly produce severe pitting and corrosion.

In view of problems such as the foregoing with respect to metal ventilation pipes and fittings, alternative materials have been employed. For example, polyvinyl-chloride (PVC) has been utilized as an alternative to metal materials. However, PVC materials have the potential of producing toxic fumes when exposed to open flames, such as may result in the event of the occurrence of a house fire. Also, although PVC materials can be employed for heating appliances having efficiencies over 90 percent, PVC materials per se cannot withstand the flue gas temperatures typically produced by heating appliances having an efficiency in the range of 80 percent to 90 percent.

A substantial advance in the state of the art with respect to ventilation systems for high efficient gas heating appliances appears to be provided by a ventilation system developed by Hart & Cooley, and marketed under the trademark ULTRAVENT®. This system employs a relatively new resin marketed by G.E. Plastics, and comprising a high-temperature engineering thermoplastic. The resin appears to have a high resistivity to relatively high temperatures and corrosion. The resin also appears to provide substantive protection against condensation and acidity in ventilation system applications. Also, the resin does not support combustion or the production of toxic fumes, even when the resin is exposed to direct flames. For purposes of disposing of condensation, the ULTRAVENT® ventilation system also provides for the use of a condensate discharge fitting, which collects potentially corrosive condensation and drains the same out of the ventilation system.

The ULTRAVENT® ventilation system and other venting systems advantageously accommodate positive pressure within the pipes and fittings of the systems. However, to provide for accommodation of positive pressure, and to ensure against the leakage of flue gases, interconnections of pipes and fittings within the systems must be properly sealed.

Various means are known for interconnecting pipes and pipe fittings of ventilation systems. For systems accommodating positive pressure, it is known to employ sealants which are applied to pipes and pipe fitting joints while they are in a semi-fluidic state. The sealants then harden or "set up" so as to provide an appropriate seal. For ventilation system materials such as PVC or other solvent-bond materials, a number of known sealants are available which set up relatively quickly after application. However, for certain types of materials, the only known sealants which provide for a relatively quick set-up may be toxic and inappropriate for use in residential and commercial establishments.

Other types of sealants appropriate for providing pressure and leakage seals may take somewhat longer to set up. During the period of time that the sealant is curing, it is possible that the pipe and pipe fitting joints may accidently disengage or become misaligned. For example, in relatively complex or large ventilation systems, a substantial number of pipe and pipe fitting joints may be assembled. With such systems, accidental disengagement or misalignment of one joint while the assembler is working on another joint may readily occur, particularly if the sealants are relatively early in their cure periods. Also, even when the sealants cure, and provide both an adhesive and a mechanical joint, accidental disengagement is a possibility.

It is known to employ various types of structural elements for interconnecting pipes and pipe fittings, both within the ventilation system industry and otherwise. For example, Durkin, U.S. Pat. No. 4,865,674 issued Sept. 12, 1989 discloses a method and apparatus for interconnecting thermoplastic pipes.

More specifically, Durkin discloses the use of an interconnecting sleeve made from a strip of relatively thin spring steel. The strip of spring steel is initially stamped to a configuration as shown in FIG. 2 of the Durkin patent. A series of barbs are formed integrally within the stamping, and are alternately bent plus or minus 45° from the stamping thickness. The spring steel strip is further formed so as to provide for a series of three parallel circuit paths, with the paths being approximately equal in length and resistance. The spring steel strip is also formed with a pair of terminals at opposing ends of the strip. After construction, the sleeve is cylindrically rolled to a desired diameter. A staggered or serpentine seam is provided along each lateral edge, so that no electrical contact is made completely along the sleeve circumference. With the stamping rolled to the cylindrical configuration, the terminals are projected radially outward so that a voltage can be applied to the seam, for purposes of providing a parallel current flow through the sleeve.

As the sleeve is rolled into a cylinder, the barbs are positioned so as to extend toward inside and outside diameters. The barbs are compressed toward the stamping thickness as a pipe is inserted in the inside diameter of the sleeve, and as a fitting or second pipe is mounted on the outside diameter.

With the sleeve and pipes appropriately positioned, a voltage is applied to the terminals of the sleeve. As current flows through the parallel paths of the sleeve, heat is generated which causes the plastic from the pipes to melt. As the plastic melts, the compressed barbs will begin to move toward their "relaxed" positions. Such movement will displace plastic along the barbs' paths, and the displaced plastic will move into openings in the stamping, joining with plastic displaced by other barbs. After the voltage is removed from the sleeve, the plastic will again harden, thereby sealing and encasing the spring steel insert.

The barbs are defined as providing a clamping or immobilizing action during initial assembly, so as to prevent pipe separation or movement once the assembly is achieved. Although the barbs project radially relative to the sleeve, their lengths extend axially of the pipes. In this manner, assembly is facilitated while retaining immobilization.

Other types of arrangements for interconnecting pipes, pipe fittings and various types of tubes are also known. For example, Goldstein, U.S. Pat. No. 3,249,373 issued May 3, 1966, discloses a tube coupling employing a longitudinally movable biting ring. The coupling arrangement is disclosed as being employed in a system utilizing two lengths of tubing, with a first tube being sufficiently larger in internal diameter than the second tube, so as to permit telescopic entry of the second tube into the first tube.

The Goldstein arrangement utilizes a pair of annular bands glued or otherwise affixed to the interior of the larger first tube, and arranged in an axially spaced-apart relationship. One of the bands is positioned adjacent to one end of the tube, while the other band is positioned a suitable distance inwardly of the tube. The bands are employed as abutment stops for the tube coupling device, with the device being longitudinally slidably movable within the first tube between the bands.

The coupling device itself comprises a relatively thin onepiece ring consisting of sheet metal. One peripheral edge of the ring is bent rearwardly upon itself, so as to extend into the ring and provide a double-thickness portion for purposes of reinforcement. A set of teeth or prongs are formed at the periphery of the thickened portion of the edge, and are arranged in a circumferential manner. The teeth extend toward the other end of the ring, and are bent so as to extend at an angle, thereby projecting radially inwardly of the formed annulus. The external diameter of the ring is such that it can slidably move, without interference within the larger first tube, between the bands until the ring abuts one or the other of the bands, depending upon the direction of longitudinal travel.

The diameters of the tubes are formed such that the smaller second tube will enter the larger first tube and initially slidably engage the bands, with the bands serving so as to center and guide the second tube. The second tube is longitudinally or axially advanced into the larger tube until the forward end of the second tube engages the coupling ring. Continuing advancement of the second tube will actuate the coupling ring, with the advancing movement continuing until the coupling ring abuts the innermost band. Further advancement of the second tube will cause the teeth of the coupling ring to be flexed against the inner peripheral bounding surface of the ring, thereby substantially flattening the teeth. Any withdrawing movement of the tubes for purposes of separation will carry the ring with the moving tube until the ring abuts an end band, which prevents further retraction of the ring. The teeth are thereby bent into the tube and substantially gouged into the peripheral surface of the tube. Any further withdrawing movement of the second tube will cause even deeper penetration of the teeth into the tube, with further angular deflection of the teeth. In this manner, a locked configuration can be provided for the tubes.

Leadbetter, U.S. Pat. No. 2,831,711 issued Apr. 22, 1958, discloses the use of a connector sleeve designed to fit over and embrace ends of plastic pipes to be connected. Leadbetter also discloses the use of sealing materials to prevent escape of gas or liquid flowing through the interconnection joint.

The Leadbetter arrangement further includes a pair of fluid seals, with each seal being located in an end portion of the sleeve for operative engagement with the pipes inserted within the rings. The rings are formed from a resilient material, chemically inert with respect to the liquid or gas conveyed by the pipes. Each of the sealing rings is seated within an annular groove within the inner surface of the sleeve, and is sized so as to project inwardly beyond the inner sleeve surface. When a pipe length is inserted into one end of the connector, the pipe will engage and distort the sealing ring, so as to force the ring into tight contact with both the pipe length and the groove in which the ring is sealed. The ring is thereby prevented from being displaced by fluid pressure within the connector, while still providing for an effective sealing of the joint against fluid leakage.

For purposes of preventing longitudinal displacement of the pipe lengths from the connector, a locking arrangement is provided in each end portion of the sleeve, which permits insertion of the pipe but substantially prevents pipe withdrawal. More specifically, the locking arrangement includes a pair of split metallic rings having a generally frusto-conical shape, with a knife edge circumferentially extending around the periphery of the smaller end. Correspondingly, the inner surface of the connector sleeve is provided with a pair of outer annular grooves for removably receiving the split metallic rings. Each of the grooves forms a radially extending shoulder and an inclined surface extending from the end of the shoulder interiorly of the sleeve to the inner surface thereof. The shape of the grooves thereby conforms to the general shape of the locking rings. The depth of the grooves is such that the rings will be slightly spaced from groove surfaces, and extend beyond the sleeve inner surfaces. The respective knife edges are, therefore, directed angularly inwardly for engagement with the pipes. With the inclination of the knife edges in the direction of pipe insertion, the resiliency of the pipe material will permit the pipes to pass in the inserted direction. However, any reversal or withdrawing movement of the pipes will cause the knife edges to "bite" into the pipes around the pipe peripheries.

As the knife edge of each ring bites into the pipe, material is displaced therefrom in the form of shavings. The shavings will wedge themselves into the space between the ring and the adjacent groove surface, thereby assisting the locking action. In this manner, the pipes are locked within the connector sleeve.

Munger, U.S. Pat. No. 2,785,910 issued Mar. 19, 1957, discloses a molded pipe joint for use in coupling lengths of plastic and/or reinforced plastic pipe. More specifically, Munger discloses a pipe coupling member having a centrally located inwardly extending annular flange against which an end portion of a pipe to be interconnected abuts. Outer faces of the flange are beveled inwardly so as to assist in centering the end portion of the pipe within the coupling. An annular groove is cut into the inner surface of the coupling between the flange and the coupling end. A bore connects the annular groove with the exterior of the coupling. Adhesive is pumped inwardly through the bore, and completely fills the annular space between the pipe end and the interior wall of the coupling.

An annular spring catch member is mounted within the annular groove. The member has a V-shaped cross section, and is positioned within the groove with one side flush with the bottom of the groove and the other side extending diagonally inwardly toward the center of the coupling member. A wire is confined between the sides of the V-shaped member adjacent the pointed end, so as to urge the sides toward their extended relation. The inwardly extending side of the V-shaped member is notched so as to provide a series of inwardly extending catch fingers which bite into the surface of the end portion of the pipe, so as to prevent withdrawal once the pipe is inserted into the coupling. The fingers are also disclosed as assisting and centering the pipe end within the coupling. A similar arrangement is disclosed for use with an elbow-type interconnection of pipes.

Graham, U.S. Pat. No. 3,976,314 issued Aug. 24, 1976, discloses a coupler arrangement for ductile or deformable tubing. In one embodiment disclosed in the Graham arrangement, a T-coupler includes three ports, each adapted to receive a tube. Inserted within each port is a ferrule having a cylindrical configuration and composed of a stiff material, such as brass or similar metal. The inner end of each ferrule is provided with a radially-inward flaring circumferential lip. A radially-outward flaring circumferential lip is provided at the outer ferrule end.

The ferrule is inserted into the port and is sized so as to provide a friction fit with the walls of the coupler body. An adhesive can be provided on the outside surface of the ferrule and the inside surface of the port walls. Each of the ports includes an annular and enlarged diameter portion. The diameter of the ferrule corresponds to that of the ports, except for the outwardly extending lip. The lip fits within the enlarged annular portion of the port, and prevents further entry of the ferrule into the coupler body. The outwardly flaring lip bites into the wall of the port, so that the ferrule cannot be easily removed from the coupler body. After the ferrule has been inserted within the port, the tube is inserted through the ferrule until the end projects past the inwardly flaring lip. The tube projection is arrested by the reduced diameter of the internal passageway of the T-coupler.

The inwardly flaring lip will bite into the tubing as the tubing is inserted within the port. The lip is at an angle of slightly less than 90° to the main part of the ferrule body, so that the tube is firmly locked within the port and axial movement of the tube out of the port is prevented. The ferrule provides for locking of the tube within the coupler, and also provides a fluid seal for purposes of preventing escape of fluid passing through the tubes and the coupler assembly. The seal is provided by the friction fit between the ferrule and the port walls, as well as the result of the biting action of the inwardly flaring lip circumferentially around the tubing.

Nordgren et al., U.S. Pat. No. 4,676,530 issued June 30, 1987, discloses a relatively complex coupling assembly for use in fluid flow systems. More specifically, Nordgren et al. discloses a fluid flow conduit having one end comprising a luer or tapered male slip fit connector, which is connected to a press fitted coupling assembly. The coupling assembly includes an annular collar having an internally threaded bore on its inner wall. The collar is provided with knurling on the outer periphery so as to facilitate manual threading of the collar to a correspondingly threaded end of a second female luer fluid flow conduit.

Positioned about the inlet end of the internally threaded bore is an annular groove in which the outer periphery of an annular disc type locking washer can be snap fitted so as to form a sliding fit between the washer and the groove. Depending upon the respective diameters of the groove and the washer, these elements can be relatively rotatable with respect to each other. The annular collar can draw the female luer connector onto the tapered male connector until the tapered surfaces of the male connector and the female luer connector are in an interference fit with each other.

The coupling arrangement also includes a cap device utilized as a dust cover, and also as a depth gauge to assure that the annular collar is axially aligned. The locking disc is engaged on the male luer with sufficient force so that both a threaded connection and an interference fit with the female luer are obtained. The annular washer can be shaped with a generally circular outer periphery, and sized so that it can be snap fitted into the groove on the inner wall of the annular collar. The washer can also be shaped so as to form an arc in cross-section, or a segment of a spherical surface in which the inner periphery is bowed with respect to the outer periphery. The inner periphery can define an opening in the disc type locking washer having a diameter or being sized so that the opening will be less than the root diameter of the tapered male connector.

The washer can be mounted rotatably in the groove so that it is transverse to the longitudinal line of the tapered male connector, with the bow facing towards the outlet end of the threaded bore of the annular collar. In this position, the coupling device is allowed to slide about the tapered male connector during assembly, and the locking washer is allowed to be moved longitudinally along the diameter thereof until the edges of the inner periphery engage and anchor the coupling device onto the male connector.

Nordgren et al. further discloses the notching of the inner periphery edge for the locking washer. Various notching arrangements are illustrated in the Nordgren et al. patent. The purpose of the notching is to provide sufficient resilience so that the locking member can engage the tapered male connector. After the locking washer is forced down on the tapered connector, back pressure against the notches will cause the same to bite deeper into the tapered connector in opposition to any potential separating force.

The foregoing describes only several of many arrangements employed for interconnecting pipes, pipe fittings, tubes and similar structures. As is apparent from the foregoing, many of these devices are relatively complex. In addition, a number of devices require substantial "process" to provide the interconnections, such as the application of electrical current within the Durkin device. Still other devices require particular structural configurations (such as inner grooves and the like) within the pipes and pipe fitting elements to be connected.

SUMMARY OF THE INVENTION

In accordance with the invention, an interconnection arrangement is provided for structurally interconnecting together at least two pipe segments, comprising first and second pipe segments. A coupling device is adapted to be interposed between the pipe segments for structurally coupling together the segments. The interconnection arrangement includes a plurality of clips, with each of the clips including a first portion adapted to engage the coupling device. The clips also include a second portion coupled to the first portion and having embedding means adapted to be at least partially embedded within the coupling device and the first or second pipe segments, so as to rigidly secure together the coupling device to the pipe segments.

The embedding means includes a plurality of tines. The second portion of each of the clips comprises a substantially planar section, and each of the plurality of tines is acutely angled relative to the planar section. A first set of the plurality of tines is angled upwardly relative to the planar section, and a second set of the plurality of tines is angled downwardly relative to the planar section.

Each of the tines of the first set is positioned along a first lateral edge of the planar section. Correspondingly, each of the tines of the second set is positioned along a second lateral edge of the planar section, parallel to and opposing the first lateral edge. Each of the plurality of tines can be of a triangular configuration. Each triangular configuration can be a right-angled configuration having one leg formed along one of the lateral edges.

The first portion can include a U-shaped lip having a gap formed thereby. When the first portion engages the coupling device, the gap engages a longitudinal edge surface of the coupling device. Further, when the first portion engages the coupling device, the second portion is positioned along an inner surface of the coupling device.

Each of the clips can be formed of a single piece of spring steel having a substantially rectangular configuration. The first portion can be formed by bending rearwardly an end section of the piece, so as to form a lip having a U-shaped gap therein. The tines can be stamped along opposing lateral edges of the piece. The interconnection arrangement can also include a sealant adapted to be interposed between the pipe segments and the coupling device.

In accordance with another aspect of the invention, the pipe segments can include a first pipe segment having a first end section with a first diameter, and a second pipe segment having a second end section with a second diameter relatively smaller than the first diameter. The first portion of each of the clips can be adapted to engage either of the first or second pipe segments. The second portion coupled to the first portion can include embedding means adapted to be at least partially embedded within an inner surface of the first end section and an outer surface of the second end section. In accordance with a further aspect of the invention, the interconnection arrangement can utilize clips with two pipe segments and a coupling device, wherein the first portions of each of the clips is adapted to engage either the first or second pipe segments.

BRIEF DESCRIPTION OF THE DRAWING

The invention will now be described with respect to the drawing, in which.

DESCRIPTION OF THE PREFERRED EMBODIMENTS

The principles of the invention are disclosed, by way of example, in a clip interconnection arrangement 100 as illustrated in FIGS. 1-10. The clip interconnection arrangement 100 provides a means for rigidly interconnecting pipes and pipe fittings adapted to be secured through the use of a sealant, during the period of time that the sealant is curing. In addition, when the sealant has cured between the pipes and/or pipe fittings, the clip interconnection arrangement 100 also provides additional safety with respect to the interconnection arrangement, by providing additional strength against accidental disengagement. The clip mounting arrangement 100 is particularly adapted for use with pipe and pipe fitting materials employing sealants having a relatively long cure period.

Figure 1:
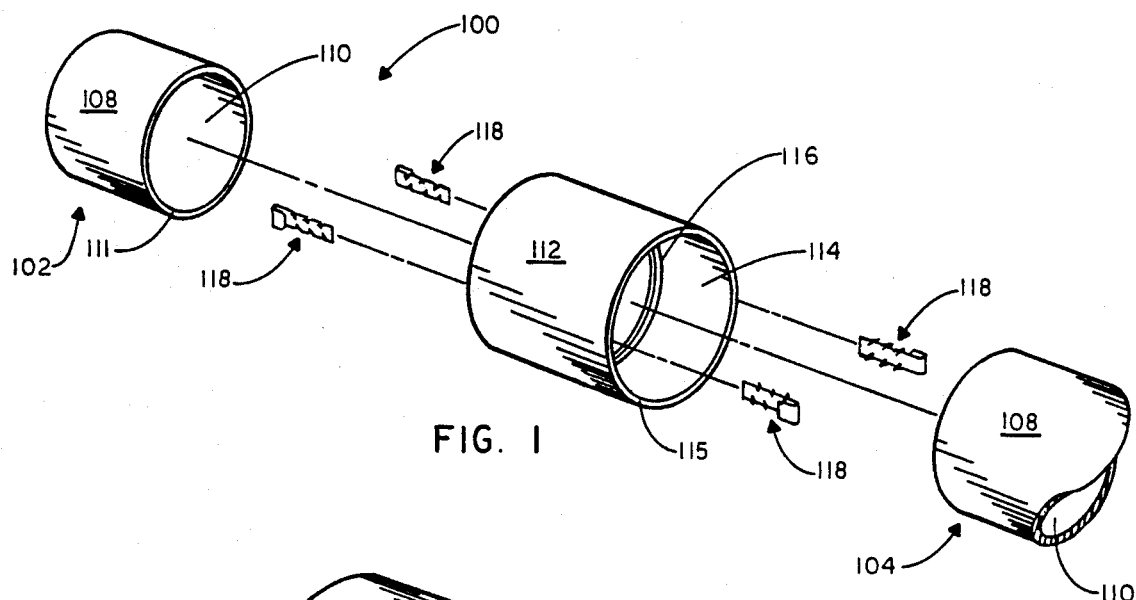
FIG. 1 is an exploded view of a clip coupling arrangement in accordance with the invention, with the view illustrating a pair of pipe segments, a sleeve coupling and four clips employed with the invention.

With reference first to FIGS. 1-5, and specifically with respect to FIG. 1, the clip interconnection arrangement 100 is shown as being utilized for interconnection of a pair of pipe segments 102 and 104. In the particular embodiment shown in FIGS. 1-5, the pipe segments 102, 104 are of equal diameter. Accordingly, for purposes of interconnection of the same, a sleeve coupling 106 is also employed. Each of the pipe segments 102, 104 is of a cylindrical configuration, having an outer peripheral surface 108 and an inner peripheral surface 110 of a relatively smaller diameter dependent upon the thickness of the pipe segments 102, 104. The ends of the annular bodies of pipe segments 102, 104 are defined by longitudinal edge surfaces 111. Correspondingly, the sleeve coupling 106 is also cylindrical in configuration and comprises an outer peripheral surface 112 and an inner surface 114. The ends of the annular body of coupling 106 are defined by longitudinal edge surfaces 115.

Figure 4:
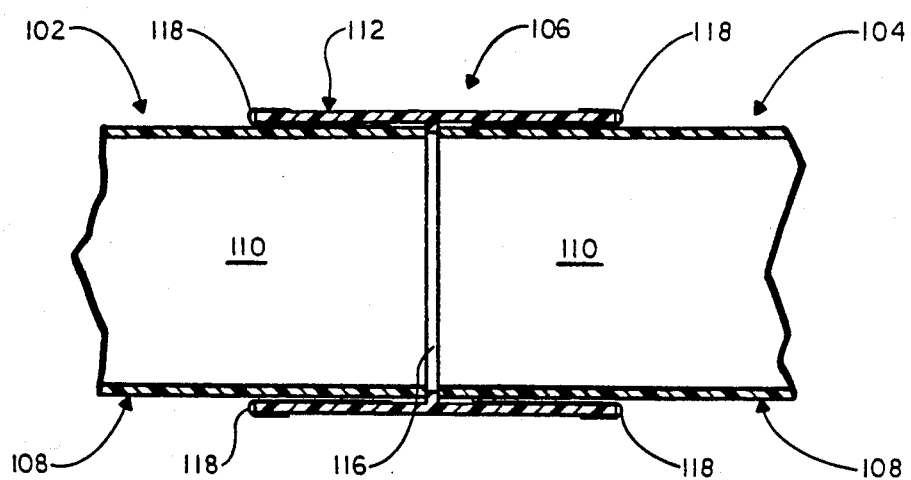
FIG. 4 is a sectional view of the interconnection shown in FIG. 3, and taken along lines 4—4 of FIG. 3.
Figure 5:
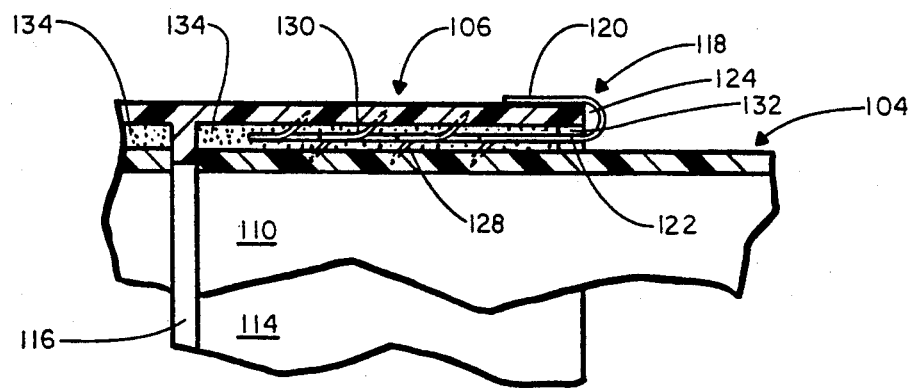
FIG. 5 is an enlarged fragmentary view of a portion of FIG. 4, showing details of one of the clips as embedded into one of the pipe segments and a sleeve coupling in accordance with the invention.

As shown primarily in FIG. 4, the inner diameter of the sleeve coupling 106 formed by the circumference of the inner surface 114 is somewhat larger than the outer diameter of either of the pipe segments 102, 104 formed by the circumferences of the outer peripheral surfaces 108. Accordingly, for purposes of interconnection, each of the pipe segments 102, 104 is telescoped into opposing ends of the sleeve coupling 106. As also shown in FIG. 4, the sleeve coupling 106 includes an annular band 116 integral with or otherwise attached to the inner surface 114 of the coupling 106, and projecting inwardly therefrom. The annular band 116 is sized so that its inner diameter is smaller than the outer diameters of the pipe segments 102, 104. Accordingly, as the pipe segments 102, 104 are telescoped into the sleeve coupling 106, the annular band 116 provides an abutment stop for each of the segments, again as primarily shown in FIG. 4.

Figure 6:
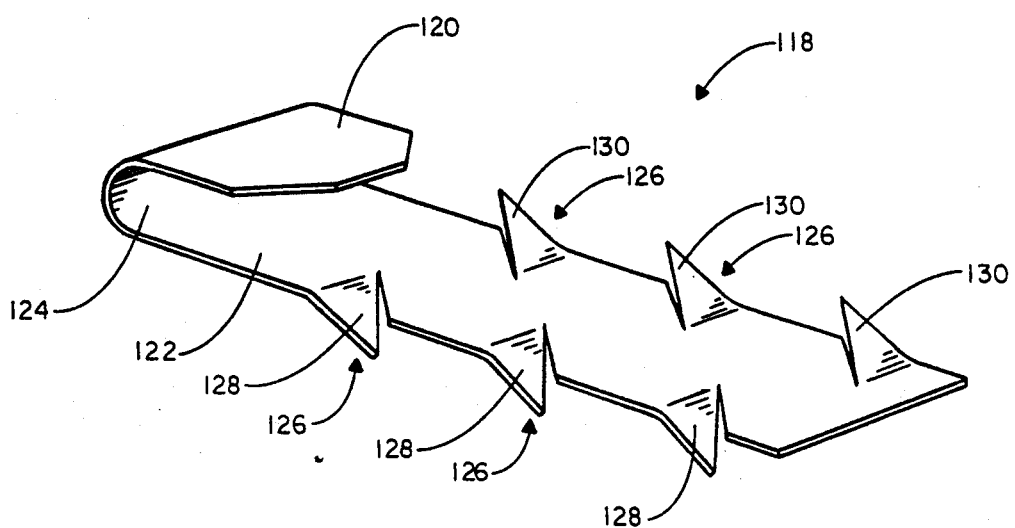
FIG. 6 is a perspective view of one illustrative embodiment of a clip which can be utilized in accordance with the invention.
Figure 7:
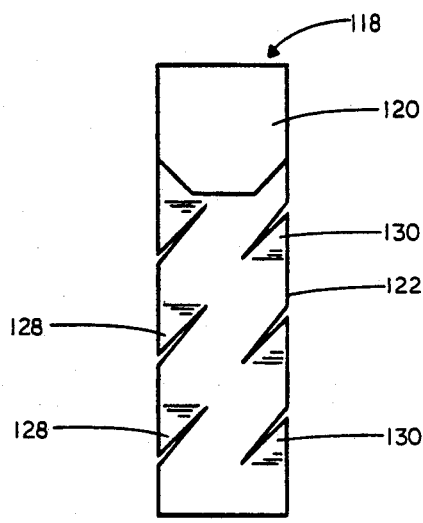
FIG. 7 is a plan view of the clip shown in FIG. 6.
Figure 8:
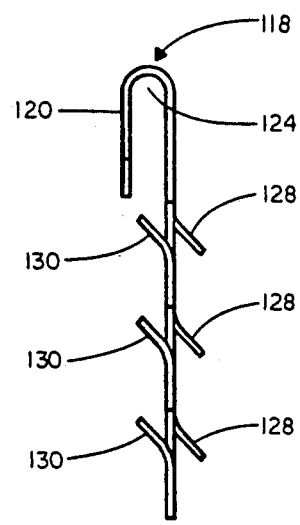
FIG. 8 is a side view of the clip shown in FIG. 6.

The clip interconnection arrangement 100 also includes, as shown in FIG. 1, a set of four clips 118. Details of the configuration of each of the clips 118 are illustrated in FIGS. 6, 7 and 8. With reference to these drawings, each of the clips 118 is preferably initially formed of a single piece of flat spring steel having a substantially rectangular configuration. One end of the spring steel piece is bent and turned rearwardly upon itself so as to form a lip 120. The lip 120 and the remaining portion of the spring steel piece, which can be characterized as a connection portion 122, form a U-shaped gap 124, as primarily shown in FIGS. 6 and 8.

Stamped from the connection portion 122 of each of the clips 118 is a series of tines 126. As shown primarily in FIGS. 6 and 7, the tines 126 are stamped substantially along opposing lateral edges of the connection portion 122, relative to the long axis of the rectangular configuration of the portion 122. Each of the tines 126 is stamped so as to have a substantially right-angled triangular configuration, with one of the legs of each triangular configuration formed from a lateral edge of the connection portion 122. As primarily shown in FIGS. 6 and 8, all of the tines 126 positioned along one lateral edge of the connection portion 122 are acutely angled in what can be characterized as a "downward" projection, while all of the tines 126 on the opposing lateral edge of the connection portion 122 are oppositely angled in what can be characterized as an upwardly angled configuration. For purposes of description, the downwardly angled tines 126 are further illustrated as tines 128 and comprise those tines which are angled away from the lip 120. Correspondingly, the tines 126 characterized as upwardly angled tines are described and illustrated as tines 130, and comprise those tines which are projected substantially toward the lip 120.

Figure 2:
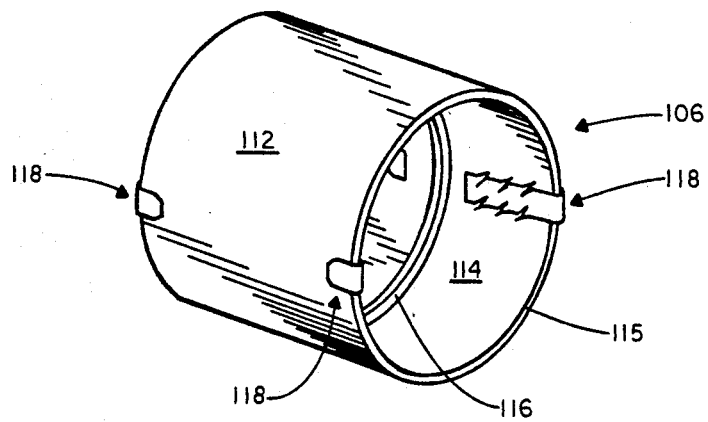
FIG. 2 is a perspective view showing the interconnection of the clips of FIG. 1 to the sleeve coupling in accordance with the invention.
Figure 3:
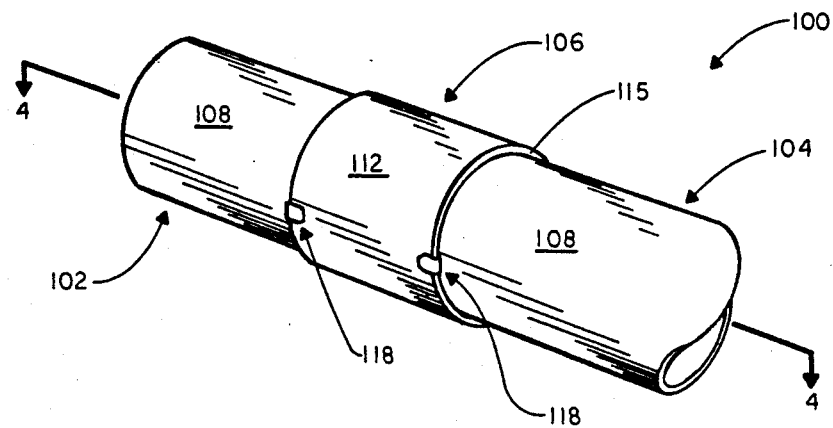
FIG. 3 is a perspective view showing the elements of FIG. 1 coupled together in a completed interconnection arrangement.

The assembly and construction of the embodiment of the clip interconnection arrangement 100 in accordance with the invention will now be described with respect to FIGS. 1-5. First, for purposes of providing a long-term pressure seal, an appropriate sealant (shown in stippled format as sealant 134 in FIG. 5) can be applied to the inner surface 114 of the sleeve coupling 106 and/or the portions of the outer peripheral surfaces 108 of the pipe segments 102, 104, to the extent that such surfaces will telescope into the sleeve coupling 106. The particular sealants which may be utilized will depend on the structure and composition of the pipes and pipe fittings employed with the interconnection arrangement. After the sealant has been appropriately applied, a series of four of the clips 118 can be appropriately positioned as shown in FIG. 1, and engaged with the sleeve coupling 106 as shown in FIG. 2. More specifically, and with reference to FIGS. 2, 4 and 5, each of the clips 118 can be engaged with the sleeve coupling 106 so that each lip 120 essentially "overhangs" one of the edge surfaces 115 of the coupling 106 and provides a "friction fit" therewith. Two of the clips 118 are engaged with one of the edge surfaces 115, while the other two clips 118 are engaged with the opposing edge surface 115 of coupling 106. Still further, the clips 118 are engaged with the lips 120 positioned along the outer peripheral surfaces 112.

Correspondingly, the connection portions 122 of the clips 118 are positioned along the inner surface 114. As shown primarily in FIG. 5, the U-shaped gaps 124 of the clips 118 are sized so that each gap 124 is of sufficient width not only to overhang the edge surface 115 of the sleeve coupling 106, but also so as to provide substantially a friction fit around the edge surfaces 115 of the sleeve coupling 106. With the clips 118 engaged with the sleeve coupling 106 as described, the downwardly angled tines 128 will project toward the center of the sleeve coupling 106, while the upwardly angled tines 130 will project against the inner surface 114 of the coupling 106. Preferably, the two clips 118 which are engaged with the same edge surface 115 are positioned so as to be diametrically opposed, as primarily shown in FIG. 2.

After the clips 118 have been appropriately engaged with the sleeve coupling 106, each of the pipe segments 102, 104 can be telescoped into opposing ends of the sleeve coupling 106, and projected inwardly until the segments abut the annular band 116. As shown primarily in FIG. 5, the relative dimensions of the outer diameters of pipe segments 102, 104 and the inner diameter of sleeve coupling 106 should be such that a gap (shown as gap 132 in FIG. 5) is provided therebetween. This gap is necessary for purposes of providing space for the sealant 134. Without sufficient space, as the pipe segments 102, 104 are projected into the sleeve coupling 106, the sealant 134 will tend to extrude from the space between the pipe segments and the sleeve coupling. On the other hand, however, it is also advantageous for the gap 132 to be of a size such that somewhat of a friction fit is provided between the connection portions 122 of the clips 118 and the pipe segments 102, 104.

With the friction fit provided between the clips 118 and the sleeve coupling 106, and also between the pipe segments 102, 104 and the clips 118, the pipe segments 102, 104 are held in a relatively rigid manner within the sleeve coupling 106. Further, however, with any relatively slight forces exerted on the pipe segments 102, 104 in a direction so as to remove the segments 102, 104 from the coupling 106, the upwardly angled tines 130 will tend to embed or "bite" into the body of the sleeve coupling 106 through the inner surface 114. Correspondingly, the downwardly angled tines 128 will tend to embed or "bite" into the body of the pipe segments 102, 104 through the outer peripheral surfaces 108. In this manner, a substantially rigid structure is provided between the sleeve coupling 106 and the pipe segments 102, 104 through the action of the clips 118. This rigid structure is of substantial advantage during the period of time that the sealant 134 is curing and is not necessarily providing a particularly rigid structure. Further, after the sealant has cured and provides a pressure seal for the interconnection of the pipe segments 102, 104, the clips 108 provide additional strength so as to prevent accidental disengagement of the pipe segments 102, 104 from the coupling 106. Indeed, with the clips 118 partially embedded within the sealant 134, it is also possible that the clips 118 provide a mechanical "reinforcement" to the seal provided by the sealant 134.

With respect to the exact structural configuration of the clips 118, the angles of the tines 126 relative to the general plane of connection portion 122 should be such that the angles are sufficient so that the tines 126 will "bite" into the surfaces of the coupling 106 and the pipe segments 102, 104. The lengths of the tines 126 must also be of sufficient length so as to allow this biting engagement. Correspondingly, the pipe segments 102, 104 and coupling 106 must also be composed of materials which allow embedding of the tines 126 into the surfaces thereof. The pipe segments and fittings of the previously described ULTRAVENT ® system are composed of suitable materials.

Figure 9:
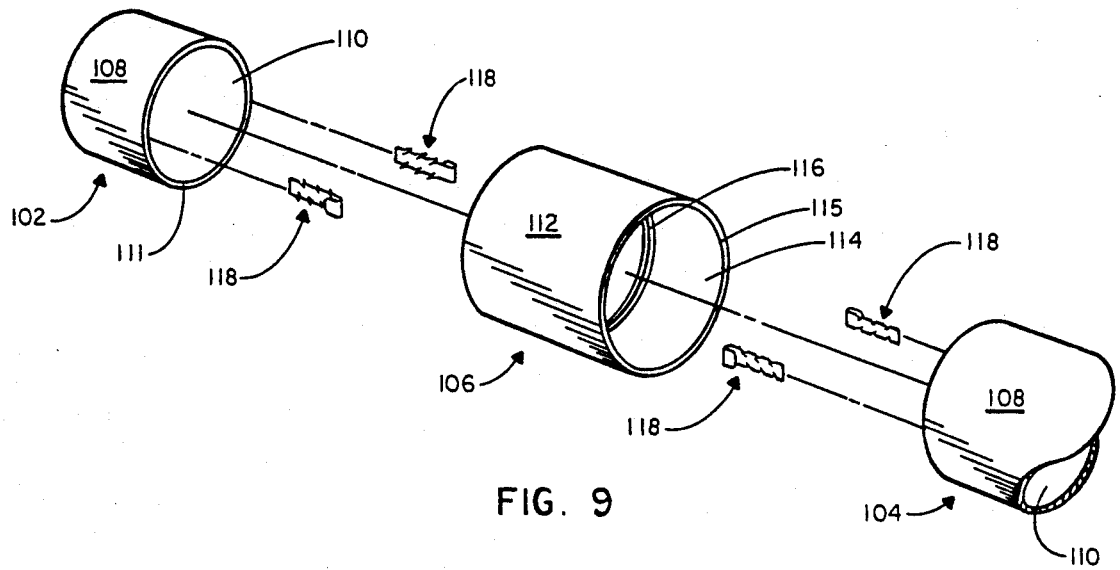
FIG. 9 is an exploded view similar in structure to FIG. 1, but showing the use of the clips as they would be positioned for interconnection on the exteriors of the pipe segments.
Figure 10:
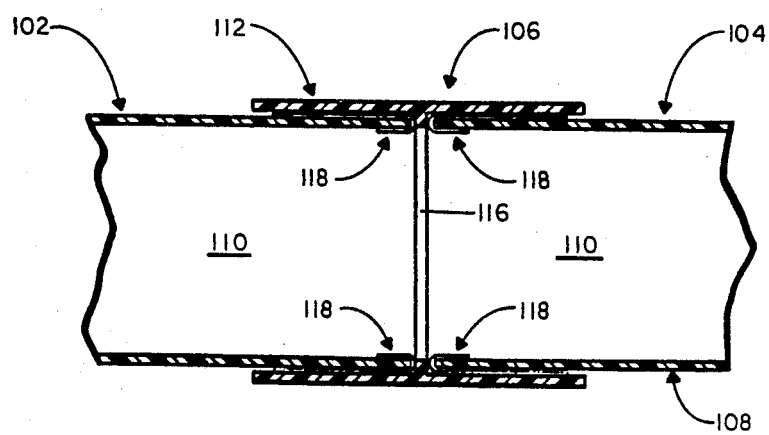
FIG. 10 is a sectional view similar in structure to FIG. 4, but illustrated with respect to the configuration shown in FIG. 9.

With the particular structural configuration of the clip interconnection arrangement 100 described herein and illustrated with respect to FIGS. 1-5, it can be noted that the lips 120 of the clips 118 are positioned outwardly along the outer peripheral surface 112 of the coupling 106 after interconnection is complete. Accordingly, these lips 120 are "in view." An alternative interconnection configuration, whereby the clips 118 are completely hidden from view, is illustrated in FIGS. 9 and 10. As shown in exploded view in FIG. 9, for purposes of interconnecting the pipe segments 102, 104 to the sleeve coupling 106, the clips 118 can first be configured and interconnected to the pipe segments 102, 104. More specifically, the clips 118 are first engaged with the longitudinal edge surfaces of the pipe segments 102, 104, with the lips 120 positioned inwardly along the inner surfaces 110 of the pipe segments 102, 104. Correspondingly, the connection portions 122 of the clips 118 are projected outwardly of the segments 102, 104 along their outer peripheral surfaces 108. As with the embodiment illustrated in FIGS. 1-5, after engagement of the clips 118, and following appropriate application of the sealant 134, the pipe segments 102, 104 are telescoped into the sleeve coupling 106. The segments 102, 104 are extended into the coupling 106 until they abut with the annular band 116. In this configuration, the upwardly angled tines 130 will embed and bite into the body of the pipe segments 102, 104 through the outer peripheral surfaces 108. Correspondingly, the downwardly angled tines 128 will embed and bite into the body of the sleeve coupling 106 through the inner surfaces 114. This configuration is reversed from the configuration shown in FIGS. 1-5. With this particular configuration, after engagement of the pipe segments 102, 104 with the coupling 106, the clips 118 are completely hidden from view.

The clip interconnection arrangements illustrated in FIGS. 1-10 and described herein in accordance with the invention have employed a sleeve coupling 106. However, the clip interconnection arrangements in accordance with the invention can be employed with various types of pipes and pipe fittings. For example, fittings would not necessarily have to be employed, and a clip interconnection arrangement in accordance with the invention could be employed with a pair of pipes to be interconnected, where one of the pipes is of relatively smaller diameter and is directly telescoped into a pipe of relatively larger diameter. Alternatively, rather than the pipes being of completely different diameters, a pipe segment can have an end section forming a flare or flange-type section of a different diameter, so that one of the pipe segments can be telescoped into the other of the pipe segments. In general, clip connections in accordance with the invention require longitudinally overlapping sections of pipe segments and/or pipe fittings so as to provide engagement surfaces for the clip tines.

Figure 11:
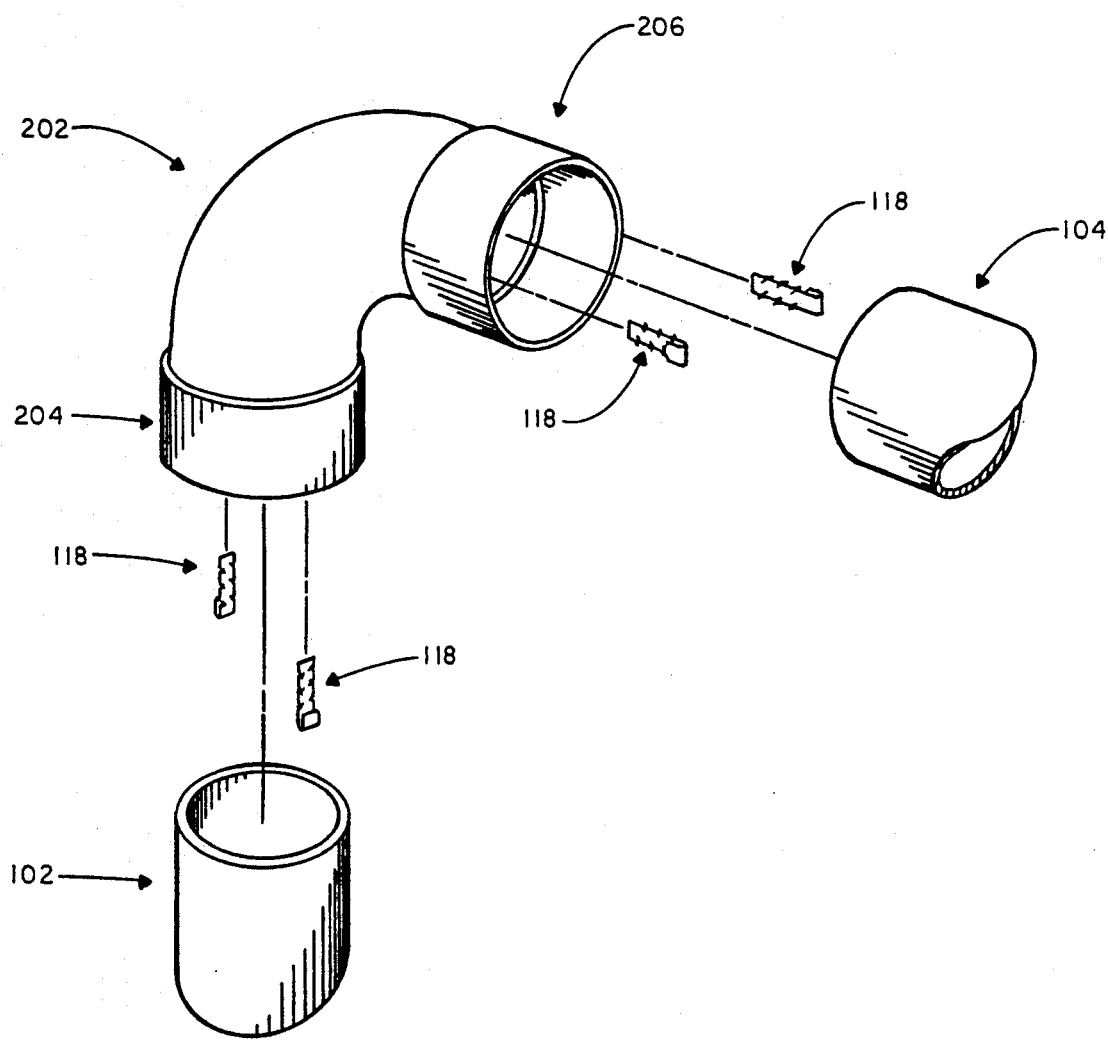
FIG. 11 is an exploded view similar in structure to FIG. 1, showing use of a clip coupling arrangement in accordance with the invention, with a pair of pipe segments and an elbow section.
Figure 9:
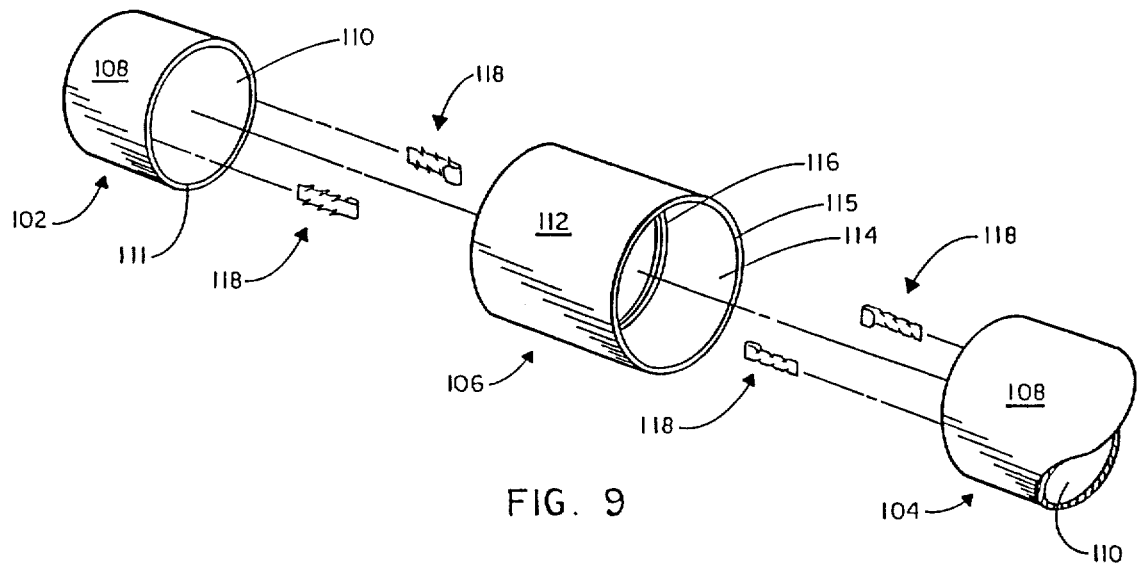

Correspondingly, clip interconnection arrangements in accordance with the invention can also be employed with various types of pipe fittings other than fittings such as coupling 106 described herein. As an example, FIG. 11 illustrates an alternative embodiment of a clip interconnection arrangement 200 in accordance with the invention. For purposes of illustrating and describing similarities, elements of the interconnection arrangement 200 similar to elements of the interconnection arrangement 100 have like numerical references. Accordingly, FIG. 11 can be characterized as illustrating a right-angled connection of two pipe segments 102, 104. The interconnection is provided through the use of an elbow fitting 202 having a right-angled configuration. For purposes of interconnection in accordance with the invention, a set of four slips 118 are again employed. In this particular instance, the elbow fitting 202 includes a first flange 204 at one end thereof, and a second flange 206 at the opposing right-angled end. The clips 118, after application of an appropriate sealant to the elbow fitting 202, can be engaged with the flanges 204 and 206 in a manner similar to the engagement of clips 118 with sleeve coupling 106 as described with respect to FIGS. 1-5. After such engagement, the pipe segments 102, 104 can be telescoped into the flanges 204 and 206, respectively. Again, the tines 126 of the clips 118 will appropriately be embedded in the bodies of pipe segments 102, 104 and the bodies of flanges 204, 206. The engagement of clips 118 between pipe segments and various other types of pipe fittings can also be employed in accordance with the invention.

It will be apparent to those skilled in the pertinent art that other embodiments of clip interconnection arrangements in accordance with the invention can be designed. That is, the principles of a clip interconnection arrangement in accordance with the invention are not limited to the specific embodiments described herein. It will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. In an interconnection arrangement for structurally interconnecting together at least two pipe segments, said arrangement comprising a first pipe segment, a second pipe segment and a coupling device adapted to be interposed between said first and second pipe segments for structurally coupling together said pipe segments, the improvement wherein said interconnection arrangement further comprises a plurality of clips, each of said clips comprising:
- a first portion externally located relative to said coupling device and having means thereon adapted to engage said coupling device to retain said clip on said coupling device; and
- a second portion coupled to said first portion having embedding means adapted to be at least partially embedded within said coupling device and within a selected one of said first and second pipe segments, for rigidly securing together said coupling device to said selected one of said first and second pipe segments, in a manner such that said embedding means is substantially hidden from external view.

2. An interconnection arrangement in accordance with claim 1 characterized in that said embedding means comprises a plurality of tines.

3. An interconnection arrangement in accordance with claim 2 characterized in that said second portion comprises a substantially planar section, and each of said plurality of tines is acutely angled relative to said planar section.

4. An interconnection arrangement in accordance with claim 3 characterized in that a first set of said plurality of tines is angled upwardly relative to said planar section, and a second set of said plurality of tines is angled downwardly relative to said planar section.

5. An interconnection arrangement in accordance with claim 2 characterized in that:
said second portion comprises a substantially planar section;
said plurality of tines comprises a first set of tines angled upwardly relative to said planar section, with each of said first set of tines positioned along a first lateral edge of said planar section; and
said plurality of tines further comprises a second set of tines angled downwardly relative to said planar section, with each of said second set of tines positioned along a second lateral edge of said planar section, parallel to and opposing said first lateral edge.

6. An interconnection arrangement in accordance with claim 2 characterized in that each of said plurality of tines is of a triangular configuration.

7. An interconnection arrangement in accordance with claim 6 characterized in that said second portion comprises a substantially planar section having parallel and opposing lateral edges, and each triangular configuration is a right-angled triangular configuration having one leg formed along one of said lateral edges.

8. An interconnection arrangement in accordance with claim 1 characterized in that said means on said first portion comprises a U-shaped lip having a gap formed thereby, wherein said first portion engages said coupling device, and said gap engages a longitudinal edge surface of said coupling device.

9. An interconnection arrangement in accordance with claim 1 characterized in that when said means on said first portion engages said coupling device, said second portion is positioned along an inner surface of said coupling device.

10. An interconnection arrangement in accordance with claim 1 characterized in that each of said plurality of clips is formed of spring steel.

11. An interconnection arrangement in accordance with claim 1 characterized in that:

each of said plurality of clips is formed of a single piece of spring steel having a substantially rectangular configuration;
said means on said first portion is formed by bending rearwardly an end section of said piece so as to form a lip having a U-shaped gap therein; and
said embedding means comprises a plurality of tines stamped along opposing lateral edges of said piece.

12. An interconnection arrangement in accordance with claim 1 characterized in that said arrangement further comprises a sealant adapted to be interposed between said coupling device and each of said first and second pipe segments.

13. In an interconnection arrangement for structurally interconnecting together a first pipe segment having at least a first end section with a first diameter and a longitudinal end surface, and a second pipe segment having an end section with a second diameter smaller than said first diameter and a longitudinal edge surface, the improvement wherein said interconnection arrangement comprises a plurality of clips, each of said clips comprising:
a first portion adapted to engage a selected one of said longitudinal end surface of said first end section and said longitudinal edge surface of said second end section; and
a second portion coupled to said first portion and having embedding means adapted to be at least partially embedded within an inner surface of said first end section and an outer peripheral surface of said second end section.

14. In an interconnection arrangement for structurally interconnecting together at least two pipe segments, said arrangement comprising a first pipe segment, a second pipe segment and a coupling device adapted to be interposed between said first and second pipe segments for structurally coupling together said pipe segments, the improvement wherein said interconnection arrangement further comprises a plurality of clips, each of said clips comprising:
a first portion adapted to engage a selected one of said first and second pipe segments and located internally thereof; and
a second portion coupled to said first portion and having embedding means adapted to bite into and be at least partially embedded to said coupling device and to said selected one of said first and second pipe segments, for rigidly securing together said coupling device to said selected one of said first and second pipe segments, in a manner such that said embedding means is substantially hidden from external view.

15. An interconnection arrangement in accordance with claim 14 characterized in that said embedding means comprises a plurality of tines.

16. An interconnection arrangement in accordance with claim 15 characterized in that:
said second portion comprises a substantially planar section;
a first set of said plurality of tines is angled upwardly relative to said planar section, and a second set of said plurality of tines is angled downwardly relative to said planar section.

17. An interconnection arrangement in accordance with claim 15 characterized in that:
said second portion comprises a substantially planar section;

said plurality of tines comprises a first set of tines angled upwardly relative to said planar section, with each of said first set of tines positioned along a first lateral edge of said planar section; and said plurality of tines further comprises a second set of tines angled downwardly relative to said planar section, with each of said second set of tines positioned along a second lateral edge of said planar section, parallel to and opposing said first lateral edge.

18. An interconnection arrangement in accordance with claim 15 characterized in that each of said plurality of tines is of a triangular configuration.

19. An interconnection arrangement in accordance with claim 14 characterized in that said first portion comprises a U-shaped lip having a gap formed thereby, wherein when said first portion engages a selected one of said first and second pipe segments, said gap engages a longitudinal edge surface of a selected one said first and second pipe segments.

20. An interconnection arrangement in accordance with claim 14 characterized in that when said first portion engages said selected one of said first and second pipe segments, said second portion is positioned along an outer peripheral surface of said selected one of said first and second pipe segments.

* * * * *

UNITED STATES PATENT AND TRADEMARK OFFICE
CERTIFICATE OF CORRECTION

PATENT NO. : 5,015,015         Page 1 of 2
DATED      : May 14, 1991
INVENTOR(S): David M. Fetters It is certified that error appears in the above-indentified patent and that said Letters Patent is hereby corrected as shown below:

The drawing sheet, consisting of Fig. 9, should be deleted to be replaced with the drawing sheet, consisting of Fig. 9, as shown on the attached page.

Col. 13, claim 1, line 7, between "portion" and "having" insert --and--.

Col. 16, claim 19, line 6, between "one" and "said" insert --of--.

Signed and Sealed this

Third Day of August, 1993

Attest:

MICHAEL K. KIRK

*Attesting Officer*     Acting Commissioner of Patents and Trademarks